(12) United States Patent
Kennedy et al.

(10) Patent No.: US 7,657,266 B2
(45) Date of Patent: Feb. 2, 2010

(54) E-OTD AUGMENTATION TO U-TDOA LOCATION SYSTEM

(75) Inventors: Joseph P. Kennedy, Great Falls, VA (US); John P. Carlson, Herndon, VA (US); Martin Alles, Hamilton Parish (BM); Nicolas Graube, Barrington (GB); Robert Rowe, Villefranche-sur-Mer (FR)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 12/505,638

(22) Filed: Jul. 20, 2009

(65) Prior Publication Data

US 2009/0286551 A1    Nov. 19, 2009

Related U.S. Application Data

(63) Continuation of application No. 11/015,788, filed on Dec. 20, 2004.

(60) Provisional application No. 60/530,638, filed on Dec. 19, 2003.

(51) Int. Cl.
 *H04W 24/00* (2006.01)

(52) U.S. Cl. .............. 455/456.2; 455/456.1; 455/456.5; 455/404.2; 455/423; 455/67.11; 342/357.01

(58) Field of Classification Search ... 455/456.1–456.6, 455/404.2, 423–425, 67.11; 342/357.01; 340/539.13
See application file for complete search history.

(56) References Cited

U.S. PATENT DOCUMENTS

| | | | |
|---|---|---|---|
| 5,327,144 A | | 7/1994 | Stilp et al. |
| 5,999,129 A | * | 12/1999 | Rose .......................... 342/394 |
| 6,040,800 A | * | 3/2000 | Raith et al. ................. 342/387 |
| 6,047,192 A | * | 4/2000 | Maloney et al. .......... 455/456.2 |
| 6,119,013 A | * | 9/2000 | Maloney et al. .......... 455/456.2 |
| 6,184,829 B1 | | 2/2001 | Stilp |
| 6,191,737 B1 | * | 2/2001 | Havinis et al. ............... 342/450 |
| 6,230,018 B1 | | 5/2001 | Watters et al. |
| 6,249,252 B1 | * | 6/2001 | Dupray ........................ 342/450 |
| 6,252,543 B1 | * | 6/2001 | Camp .................... 342/357.06 |
| 6,356,763 B1 | * | 3/2002 | Kangas et al. ............. 455/456.1 |
| 6,522,887 B2 | * | 2/2003 | Larsson et al. ........... 455/456.5 |
| 6,597,916 B2 | * | 7/2003 | Edge ....................... 455/456.1 |
| 6,757,545 B2 | | 6/2004 | Nowak et al. |
| 6,782,264 B2 | | 8/2004 | Anderson |
| 6,876,859 B2 | * | 4/2005 | Anderson et al. ........ 455/456.1 |
| 6,901,264 B2 | * | 5/2005 | Myr ........................ 455/456.5 |
| 6,985,903 B2 | | 1/2006 | Biacs |
| 6,996,392 B2 | | 2/2006 | Anderson et al. |
| 6,999,780 B1 | * | 2/2006 | Zhao ....................... 455/456.5 |

(Continued)

OTHER PUBLICATIONS

Off Act parent, Feb. 23, 2007.

(Continued)

*Primary Examiner*—Sharad Rampuria
(74) *Attorney, Agent, or Firm*—Duane Morris LLP

(57) ABSTRACT

A method for use in a wireless communication system with a network overlay geolocation system having a sparse deployment network in which base stations of the wireless communication system may or may not have a co-located wireless location sensor (WLS). The method uses U-TDOA measurements on the uplink (reverse) signal and E-OTD measurements on the downlink (forward) signals to estimate a location for a mobile appliance.

31 Claims, 8 Drawing Sheets

U.S. PATENT DOCUMENTS

| | | | |
|---|---|---|---|
| 7,031,722 B2 * | 4/2006 | Naghian | 455/456.1 |
| 7,054,283 B2 | 5/2006 | Carlsson et al. | |
| 7,082,311 B2 * | 7/2006 | Hefner et al. | 455/456.1 |
| 7,110,774 B1 * | 9/2006 | Davis et al. | 455/456.1 |
| 7,130,642 B2 * | 10/2006 | Lin | 455/456.1 |
| 7,162,252 B2 | 1/2007 | Kennedy, Jr. et al. | |
| 7,170,447 B2 | 1/2007 | Riley et al. | |
| 7,317,933 B2 | 1/2008 | Rached et al. | |
| 7,358,898 B2 * | 4/2008 | Kennedy et al. | 342/417 |
| 7,460,870 B2 | 12/2008 | Moeglein et al. | |
| 7,593,738 B2 * | 9/2009 | Anderson | 455/456.1 |
| 2002/0094821 A1 | 7/2002 | Kennedy, Jr. | |
| 2002/0168989 A1 * | 11/2002 | Dooley et al. | 455/456 |
| 2004/0176109 A1 | 9/2004 | Niemenmaa | |
| 2004/0180645 A1 * | 9/2004 | Bussan et al. | 455/404.2 |
| 2004/0203882 A1 | 10/2004 | Laiho et al. | |
| 2005/0136945 A1 * | 6/2005 | Kennedy et al. | 455/456.1 |
| 2005/0272447 A1 * | 12/2005 | Eckel | 455/456.6 |
| 2006/0116130 A1 | 6/2006 | Kennedy, Jr. et al. | |
| 2006/0211431 A1 | 9/2006 | Mansour et al. | |

OTHER PUBLICATIONS

Off Act parent, Apr. 8, 2008.
Off Act parent, Sep. 15, 2008.
Off Act parent, Mar. 24, 2009.
NoA parent, Jul. 22, 2009.

* cited by examiner

E-OTD AUGMENTATION TO U-TDOA LOCATION SYSTEM

CROSS REFERENCES

The present application is a continuation of application Ser. No. 11/015,788 filed Dec. 20, 2004 which claimed the filing date of priority to provisional application No. 60/530,638 filed Dec. 19, 2003, the entirety of each are incorporated herein by reference.

BACKGROUND

The use of wireless communication devices such as telephones, pagers, personal digital assistants, laptop computers, etc., hereinafter referred to collectively as "mobile appliances" or "mobiles," has become prevalent in today's society. Recently, at the urging of public safety groups, there has been increased interest in technology which can determine the geographic position or "geo-locate" a mobile appliance in certain circumstances.

In the United States, mobile wireless appliance locating equipment is being deployed for the purpose of locating wireless callers who dial 911. Other services in addition to emergency call servicing are contemplated and are referred to as location based services (LBS). Wireless location equipment is typically employed as an overlay to wireless communication networks, thus forming a network overlay geo-location system.

In operation, these network overlay location systems take measurements of radio frequency (RF) transmissions from mobile appliances at base station locations surrounding the mobile appliance and estimate the location of the mobile appliance with respect to the base station locations. Because the geographic location of the base stations is known, the determination of the location of the mobile appliance with respect to the base station permits the geographic location of the mobile appliance to be determined.

In a network-based geo-location system, the mobile appliance to be located is typically identified and radio channel assignments determined by (a) monitoring the control information transmitted on radio channels for telephone calls being placed by the mobile appliance or on a wire line interface to detect calls of interest, i.e., 911, and (b) a location request provided by a non-mobile appliance source, i.e., an enhanced services provider. Once a mobile appliance to be located has been identified and radio channel assignments determined, the location determining system is first tasked to determine the geo-location of the mobile appliance and then directed to report a determined position to the requesting entity or enhanced services provider.

FIG. 1 illustrates a conventional mobile-appliance communication system having base stations 10 *a-c* for communicating with a mobile appliance 20. Each base station 10 contains signal processing equipment and an antenna for transmitting to and receiving signals from the mobile appliance 20. A Base Station Controller ("BSC") and/or Mobile Switching Center ("MSC") 45 is connected to each base station 10 through a wireline connection 41. A mobile appliance location determining sensor 30 *a-c*, i.e., wireless location sensor ("WLS"), may be positioned at some or all of the base stations 10 to determine the location of the mobile appliance 20 within the signal coverage area of the communication system. A network overlay system is generally composed of two main components. One component resides at the base station that makes measurements on the RF signal emanating from the wireless device, the WLS 30. The second component resides at the mobile switch that tasks the WLS groups to collect data and then uses the data to compute a location estimate. This second component is generally referred to as the Geolocation Control System ("GCS") 50.

In the normal course of operation, the GCS 50 is tasked by an outside entity, e.g., the Mobile Positioning Center ("MPC") 40, to generate a location estimate on a particular mobile appliance. The tasking is accompanied by information on the mobile of interest including the serving base station and sector for the call and the RF channel (frequency, time slot, CDMA code, etc.) being used by the wireless communications network to complete the wireless connection. Once the GCS 50 receives this tasking, based on the serving sector, it tasks a set of WLS units 30 to make measurements on the RF emissions of the mobile 20. The WLS units 30 make the measurements and report them to the GCS 50. The GCS 50 then computes a location estimate using a mathematical or data matching algorithm. Alternatively, control signaling on RF or wireline interfaces used to set up calls in the wireless network may be scanned to detect the placement of a call of interest. The signaling that occurs on the RF control channel may be used to determine location. Call setup/channel assignment parameters may also be extracted from the control messaging to determine which traffic channel to use for location related measurements.

Network overlay location systems typically locate a mobile appliance on the traffic channels of a wireless network. The system typically uses sensors employing techniques such as Uplink Time Difference of Arrival ("U-TDOA"). In U-TDOA, the traffic channel assignment information may be provided through a separate process such as providing MOBINFO (IS-41 Mobile Information) parameters passed by the MPC 40 as part of the GPOSREQ (J-STD-036 Geolocation Position Request) message from the MPC 40 to the GCS 50.

Techniques used for geo-location (i.e., AOA, TDOA, etc.) are known and described in the art. One facet of operation that is important in the aforementioned techniques is the process whereby one site, a WLS co-located with the serving base station, is designated as the primary site and sends information bits related to a sample of the received signal to the other sites designated as secondary sites thereby assisting the secondary sites' hearability of a signal of interest to make location related measurements. Various methods have been developed to define and coordinate the associated tasking, detection and reporting functions. One such method is described in U.S. Pat. No. 5,327,144 to Stilp which is hereby incorporated by reference.

In general, network overlay geolocation systems have WLS's deployed at virtually all base station sites to achieve a desired accuracy. A specific problem in prior art methods is that a primary wireless location sensor must be located at the serving base station. Because of cost and other reasons, there is now a desire to put WLS equipment into a subset of the base station sites (sparse network deployment) and still maintain high location accuracy.

In general, U-TDOA location systems use location related measurements from many sites to estimate the location of a mobile. For example, in GSM systems typically 6 or 7 sites participate in the location estimate. One effect of not having a WLS at every site is degradation of location accuracy. For some air interfaces, this may be problematic. For example, where occupied bandwidth is small such as in AMPS and TDMA, the error associated with location estimates where the number of participating sites is reduced becomes unsatisfactory. Air interfaces such as GSM and CDMA do not suffer from this, and mobile appliances operating in these air interfaces possess wider bandwidth and/or are frequency hopped. These features allow surfaces generated from TDOA or AOA to be less corrupted by multi-path (generally, multi-path may be better resolved in the time domain), and therefore, with fewer surfaces, location estimates are generally acceptable.

Another effect of sparse deployment is "no location areas." "No location areas" are those areas in which a minimum number of WLS cannot detect or measure an attribute of a signal such that the geo-location system cannot estimate a location. Mobile appliances are power controlled by the wireless network. This means that the mobile's transmit power is changed by the network so that that minimum power is transmitted to achieve an acceptable communications link (i.e., the voice quality is acceptable). When a mobile appliance moves close to a base station site, the required transmit power for an acceptable communications link is reduced to a small value. This power control is well known in the art and is desirable because it diminishes co-channel interference and adjacent cell interference where channel reuse is employed, and prolongs the battery life of the mobile appliance. However, if the base station that is serving the mobile appliance does not have a WLS unit (due to the sparse deployment), then there is no WLS to "hear" the mobile at the serving site, and the neighboring site WLS units may not be able to hear the mobile because of the mobile's low transmit power. The result is of this phenomenon is a series of "no location areas" surrounding the base station sites without WLS equipment due to the sparse deployment.

E-OTD is also a known and described location technique whereby timing measurements are made on forward link transmissions by a handset and passed to a central site to calculate a mobile's location using TOA or TDOA methods.

E-OTD operates by making timing measurements on forward link signals with known data sequences. For GSM, the timing measurements are made on the Base Station Control Channels (BCCH). The timing measurements are forwarded via data links from the handsets to a location processor where the timing measurements, along with the locations of the source base stations, allow a location estimate to be made. One key component of the E-OTD approach is the step of "synchronizing" the time base (referencing from a time base or standard) at the transmitting base stations. In general, GSM base stations are not locked to a high accuracy reference; therefore, the timing measurements made by the handsets are not referenced to a common standard. To create the common reference or time base, E-OTD depends on measuring forward link timing from multiple base stations at known locations. The WLS's typically perform this function. In prior art, the WLS's are referred to as Location Measurement Units (LMU). WLS will mean the same as LMU for forward link timing measurement purposes. Additional refinements of the E-OTD method have eliminated the use of the WLS by synthesizing the base station common reference by taking repeated, over-determined timing location estimates on handsets, referred to as an over-determined solution.

While some prior art systems have used E-OTD as an alternative to estimate a location if the U-TDOA method could not achieve a desired accuracy, no prior art has addressed the joint use of E-OTD and U-TDOA raw measurements to obtain a location estimate, when neither method by itself can achieve a location solution or a location solution within a desired accuracy.

In view of these deficiencies, the present subject matter advantageously addresses the determination of a location estimate using both U-TDOA measurements and E-OTD measurements when a location estimate using either U-TDOA or E-OTD is not available or is not sufficiently accurate. The subject matter thus overcomes problems frequently encountered in sparse network overlays or with poor base station locations and provides a statistically independent location solution.

The advantages of the disclosed subject matter will be readily apparent to one skilled in the art to which the disclosure pertains from a perusal or the claims, the appended drawings, and the following detailed description of the preferred embodiments.

DETAILED DESCRIPTION

The present disclosure is directed to a method of providing location related measurements to thereby provide location estimates in "no location areas" as described above or provide location estimates with improved accuracy.

The present subject matter combines current U-TDOA location measurements with E-OTD measurements to achieve a location estimate for a mobile appliance operating within a geographical area defined by a wireless communication system. The present subject matter develops location surfaces from both U-TDOA measurements and E-OTD measurements to derive a location estimate.

While embodiments of the present subject matter are operable in typical network deployments, the subject matter is particularly advantageous in sparse network deployments where some, but not all, of the base stations have co-located WLSs and thus, "no location areas" are generally more of a problem. In general, a geo-location system attempts to locate a mobile appliance by receiving a signal from the mobile appliance at the primary wireless location sensor. The primary wireless location sensor typically is one co-located with the serving base station. Since the base station controls the power of the mobile's transmissions, the co-located primary WLS is in the best position to collect a strong signal.

Figure 1:
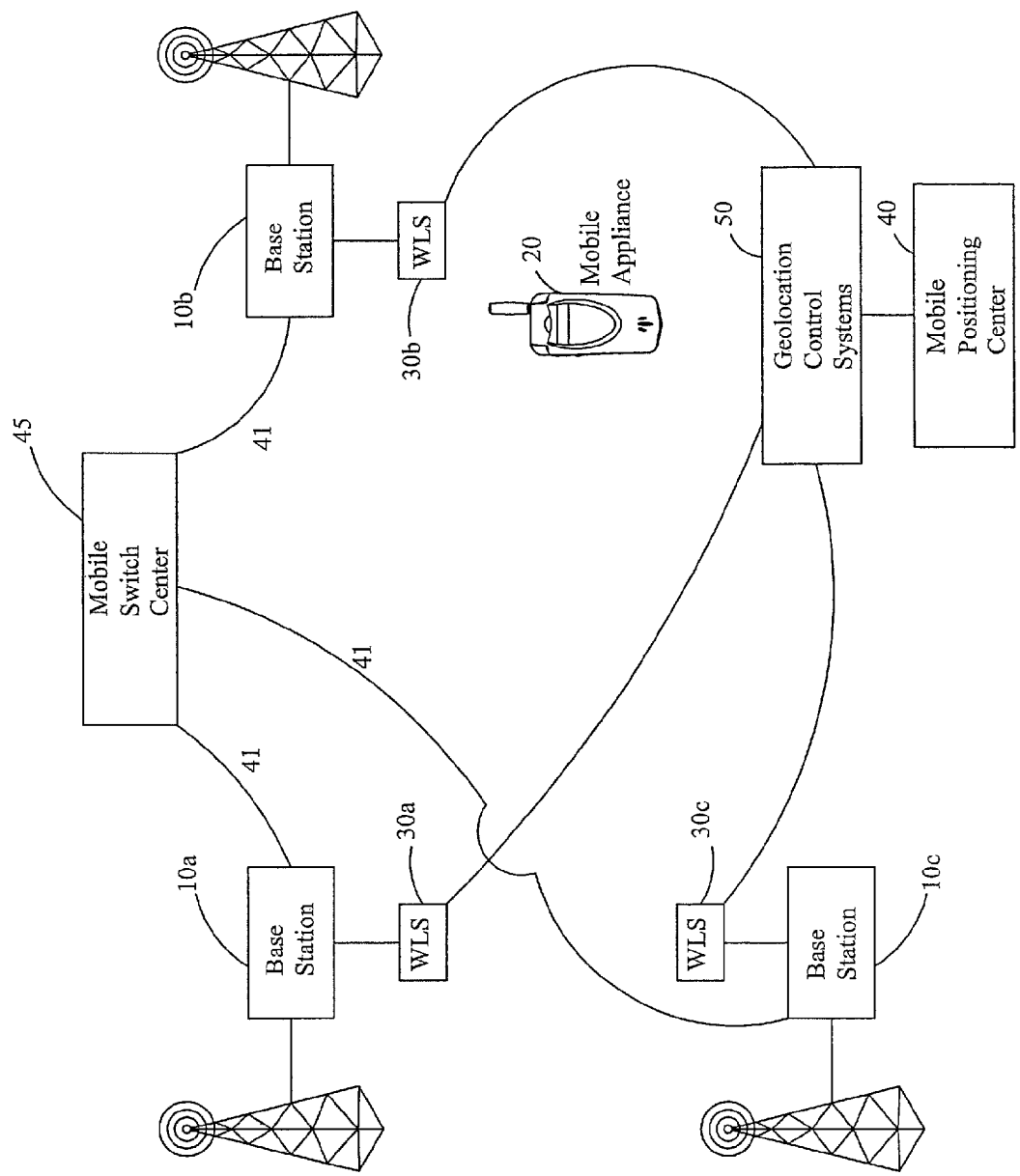
FIG. 1 is a representation of a prior art wireless communication system with a network overlay geo-location system.
Figure 2:
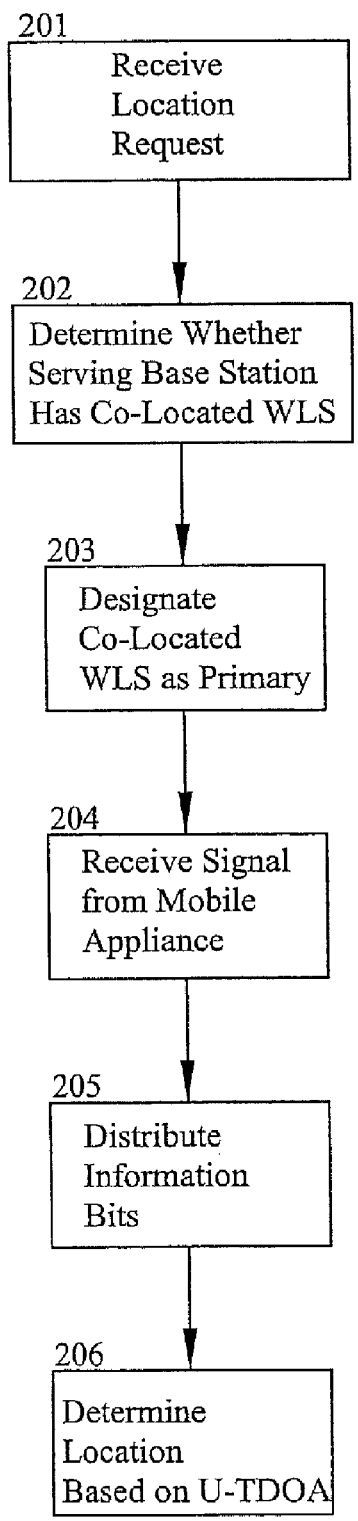
FIG. 2 is a representation of a prior art method for locating a mobile appliance.

FIG. 2 is a representative flow chart of a prior art method of locating a mobile appliance served by a base station in a wireless network. The geolocation system receives a location request as shown in Block 201. The geolocation system using a database or other source of information determines whether the serving base station has a co-located WLS as shown in Block 202. If the serving base station has a co-located WLS, then the co-located WLS may be designated as a primary site as shown in Block 203. Alternatively, the WLS receiving the signal with the least number of bit errors (or other signal quality metric) may be designated as the primary (usually this is the co-located WLS if one exists). The signal from the mobile appliance is received at a primary WLS as shown in Block 204, and the WLS distributes information bits associated with the signal to secondary WLSs to thereby assist in acquiring the signal as shown in Block 205. The secondary WLSs are the WLSs of neighboring cell sites. The primary and secondary WLS measure an attribute of the signal and determine a location for the mobile appliance based at least in part on the measured attributes as shown in Block 206. However, in sparse network deployments a co-located WLS is not always available and thus location problems may arise.

Alternatively, due to power control, geography or other deleterious effects on the mobile's signal, even if a primary WLS is located at the serving base station, it is entirely possible that neighboring base stations with WLS's will not be able to hear the signal and thus a location estimate may still not be possible.

Figure 3:
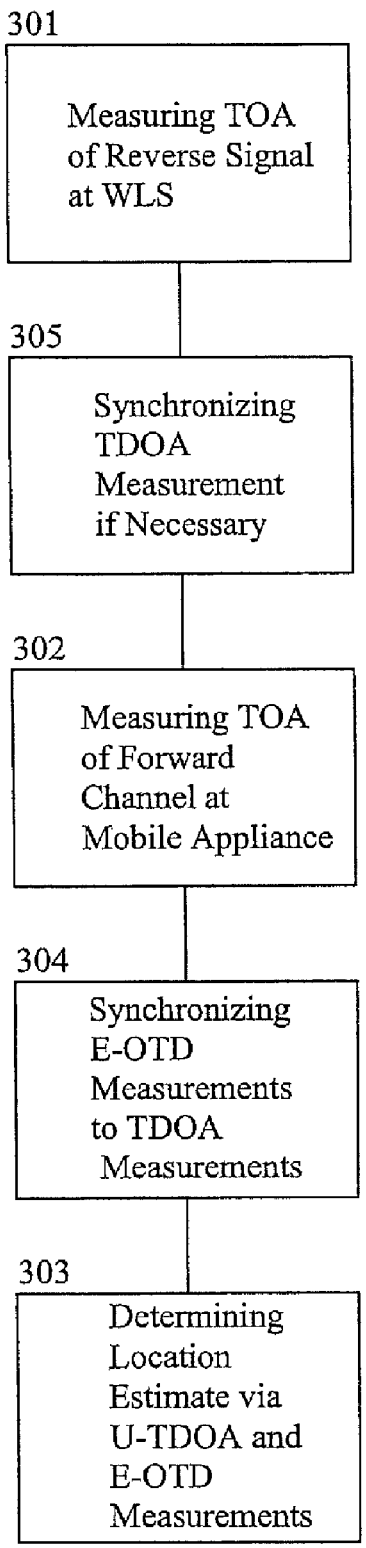
FIG. 3 is a representative flow chart of an embodiment of the present disclosure to locate mobile appliance in a U-TDOA system with E-OTD augmentation

The current subject matter encompasses embodiments that use a combination of conventional U-TDOA and E-OTD techniques. FIG. 3 describes an embodiment implemented in a conventional deployment of U-TDOA in a market where WLS units are deployed at substantially all of the base station sites of a wireless carrier. In such a configuration, TOA measurements would be made by WLS units on reverse link signals (uplink signal) from the wireless appliance in the normal fashion for a TDOA system as shown in Block 301. Additionally, E-OTD forward link timing measurements made by the handset are collected as shown in Block 302, and the combination of timing measurements are used to generate range rings and/or TDOA hyperbolas (location surfaces) to use in aggregate to estimate a location, as shown in Block 303. As described previously, a common time base must be established for the E-OTD measurements, as shown in Block 304. The creation of a common time base for the E-OTD measurements can be accomplished in a number of ways including using a conventional WLS forward link timing measurement approach, using an over-determined method, or using measurements already made as part of the U-TDOA processing. In a conventional U-TDOA system for GSM, the WLS must estimate base station timing using measurements on forward link BCCH signals to synchronize with the base station to follow mobile station frequency hopping. These timing measurements can be used to perform the operation of creating a common time base for forward link transmissions from different base stations. Further, these timing measurements can be referenced to Global Positioning System (GPS) time since each WLS estimates GPS time for U-TDOA purposes as shown in Block 305. Thus, all timing measurements (forward link and reverse link) may be referenced to a common time standard thereby making processing in the location estimator function more efficient and accurate.

Figure 4:
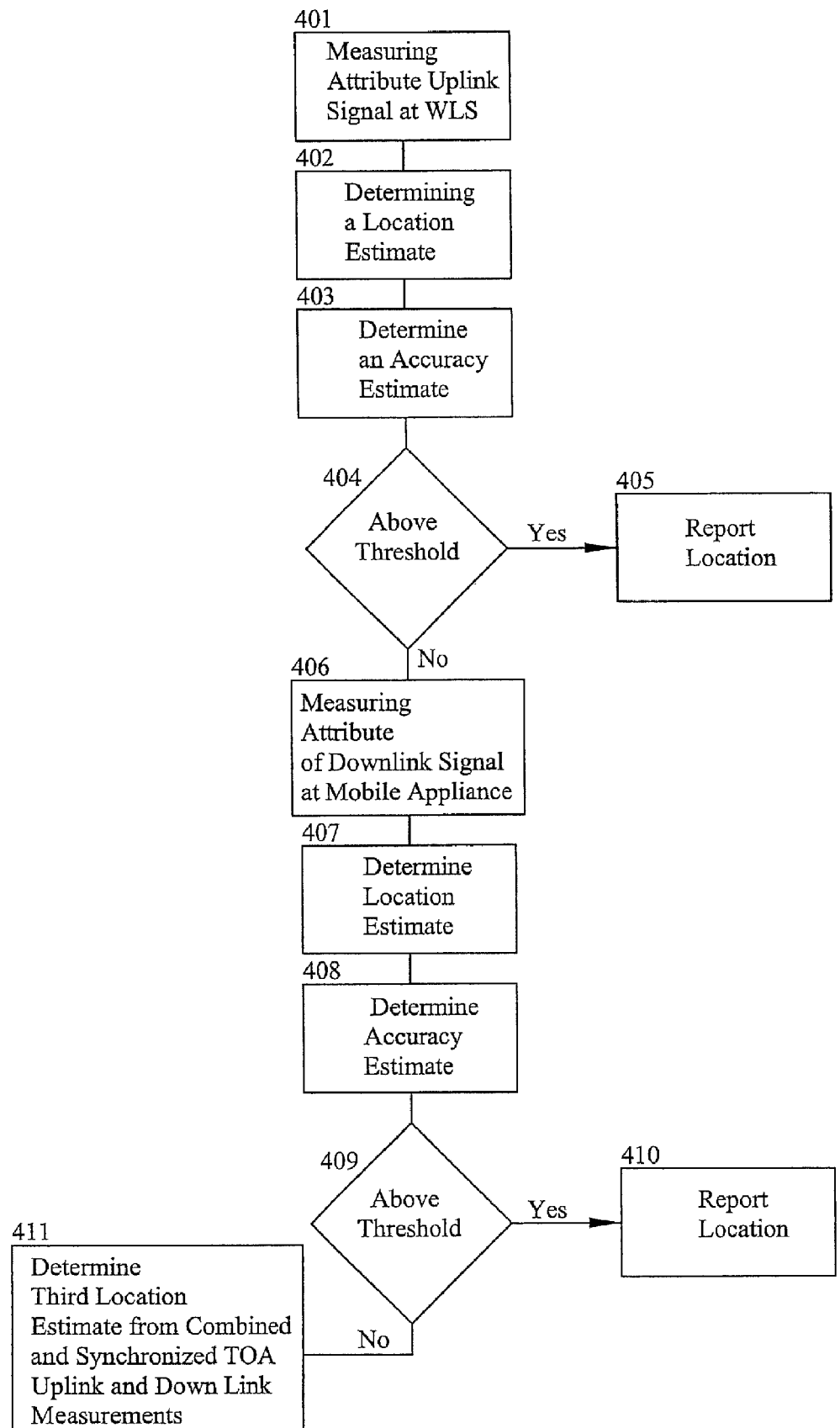
FIG. 4 is a representative flow chart of an embodiment of the present disclosure to increase the accuracy of a location estimate with E-OTD augmentation.

With reference to FIG. 4, another embodiment of the present disclosure is shown which can be used to obtain a desired accuracy. The WLS of the geolocation system according to an embodiment of the present disclosure takes measurements of an attribute of the uplink signal from a mobile appliance as shown in Block 401. In this example, the attribute is time of arrival; however, other attributes from which location surfaces can be developed may also be used. From these attribute measurements the geolocation system determines a first location estimate and a first location accuracy estimate as is known in the art as shown in Blocks 402 and 403, respectively. The first location accuracy estimate is then compared to a predetermined threshold as shown in Block 404. If the first location accuracy estimate meets the threshold, then the first location estimate may be reported as the location of the mobile appliance as shown in Block 405, or where the first location accuracy estimate is calculated first, the first location estimate may be determined and reported as the location of the mobile appliance.

If the first location accuracy estimate does not meet the threshold then an alternative location method may be employed. The alternative location method as shown in FIG. 4 is E-OTD. The mobile appliance measures an attribute of the downlink signals from one or more of the base stations as shown in Block 406. The measurements made by the mobile appliance are then sent to a processing center for a determination of a second location estimate and/or a second location accuracy estimate based on the measured attributes of the downlink signals as shown in Blocks 407 and 408, respectively. The second location accuracy estimate is then compared to a predetermined threshold as shown in Block 409. If the second location accuracy estimate meets the threshold, then the second location estimate may be reported as the location of the mobile appliance as shown in Block 410, or again, where the second location accuracy estimate is calculated first, the second location estimate may be determined and reported as the location of the mobile appliance.

However, if the second location accuracy estimate does not meet the threshold, the attribute measurements of the uplink signal and the attribute measurements of the downlink signal may be used to determine a third location estimate as shown in Block 411. The third location estimate may be derived from intersections of location surfaces derived from the measurements of the uplink signal and the location surfaces derived from the measurements of the downlink signal.

While the above embodiment was described in a serial manner, such that the U-TDOA location estimate was determined first and the E-OTD location estimate was determined in a subsequent manner, the order is illustrative only and is not intended to limit the scope of the present disclosure. Thus, it is envisioned that the E-OTD location estimate may be determined first followed by the U-TDOA location estimate. The corollary is also envisioned wherein the location estimates are determined in parallel or near parallel and the third location estimate based on both the U-TDOA and E-OTD measurements may be determined as the measurements become available.

The advantages of using the combined methods are numerous. First, the combination of measurements, both from the uplink and downlink signals, generally yield a more accurate location estimate than either separately. This is due to more statistically independent timing measurements being available to the estimation that has a performance directly related to the number, quality and independence of the input data. Applications not possible with either method independently may be enabled with the combination thereof. For example, each location method independently may achieve, for illustrative purposes, 50 to 100 meters of location accuracy. This accuracy would be questionable for turn-by-turn driving directions in a city. Whereas, the combination of the location methods may achieve on the order of 25 meters of accuracy, thus, not only improving the location accuracy, but also enabling applications requiring increased accuracy.

Another advantage of the combination is in ubiquity of service. Each of the methods provides location estimates a vast majority of the time, but there are inevitable circumstances where no location estimate can be produced or, if a location can be produced, it has insufficient accuracy. For U-TDOA only, a location estimate cannot be produced when less than three reverse link timing measurements can be made or when geometry of the base stations is poor. For E-OTD, a location estimate cannot be produced when the handset is not enabled to make E-OTD timing measurements. Furthermore, E-OTD may not function if the system fails to maintain accurate time synchronization of all base stations in the network. The combination as described herein reduces the number of circumstances when no-location estimates are generated. This is extremely beneficial for services where subscribers expect ubiquitous service. The advantage of using these two techniques together is not just related to one providing location estimates when the other cannot. A significant advantage, as garnered from the embodiments described herein, is realized from combining raw timing measurements from each technique and returning a location estimate, when the quantity or quality of timing measurements from either technique alone would be insufficient to produce an acceptable location estimate.

An additional advantage of the described subject matter is that the techniques are complimentary with respect to the universe of location-enabled service offerings envisioned. The combination, as described in the present subject matter, provides location estimate capabilities that suits present networks much better than either alone. For example, U-TDOA operates on any handset and cannot be disabled; whereas, E-OTD operates only when the handset is equipped with E-OTD timing measurement firmware. Therefore, for security or surveillance applications U-TDOA is a preferable technology. However, E-OTD can locate a handset when it is in idle mode (no phone call in process). Currently U-TDOA can locate a handset (without a reverse pilot signal) only when a call is in process. Thus, for tracking delivery fleets E-OTD would be preferable as no permanent circuit connection with the handset would need to be established to update a location.

Another implementation of the combination is where the U-TDOA system is installed in a sparse configuration in a market, and E-OTD is used to augment location timing measurements. This embodiment has advantages whereby location accuracy is improved over what a sparse U-TDOA network may produce by augmentation with E-OTD measurements, and the cost of the system is maintained significantly below a full U-TDOA installation. This advantage is gained by having the sparsely installed WLS units generate a GPS referenced common time base for the forward links from the base stations for use with the E-OTD handset timing measurements. This embodiment also enjoys the advantages described for the full U-TDOA plus E-OTD embodiment described previously. These advantages include ubiquity of location estimate availability and availability of measurements to support a network's services.

The combination of U-TDOA and E-OTD can be implemented in a number of ways depending upon the state of the underlying wireless network infrastructure, the desires of the wireless carrier, and the services to be supported. Three alternative implementations are presented herein for illustrative purposes only and are not meant to be an exhaustive list.

Figure 5:
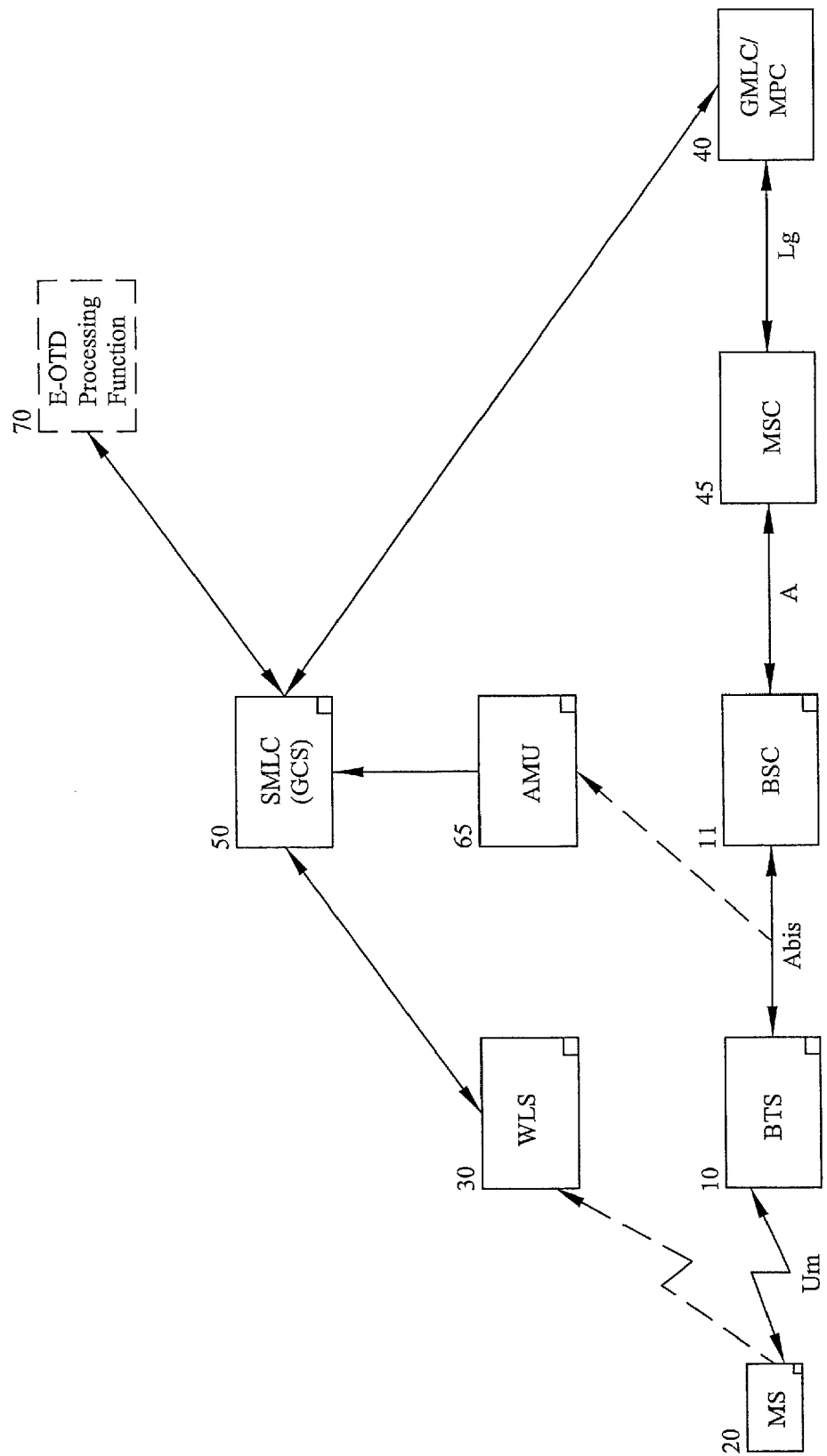
FIG. 5 is an embodiment of a E-OTD augmented U-TDOA system according to the present disclosure.

A further embodiment of a system implementing the current subject matter is shown in FIG. 5. The embodiment adds E-OTD components to a U-TDOA system where the U-TDOA system employs an Abis monitoring unit (AMU) 65 to detect call setup, gather channel assignment data, and manage the Abis monitoring link. The U-TDOA system in FIG. 5 comprises a base station 10, a base station controller 11, and a mobile switching center 45. The base station 10 communicates with the mobile station (mobile appliance) 20 over the uplink and communicates with the base station controller 11 over an Abis link. The mobile switching station 45 is connected to the gateway mobile location center or MPC 40.

As illustrated in FIG. 5, E-OTD measurement capability has been added to the mobile 20. E-OTD measurements are collected by the AMU 65 and passed to the GCS/Subscriber Mobile Location Center (SMLC) 50 to be combined with the U-TDOA measurements to generate a location estimate. The WLS 30 may provide a forward link timing common reference by measuring forward link BCCH bursts. The GCS 50 calculates location estimates based on combinations of U-TDOA and E-OTD measurements. The E-OTD processing function 70 may also be executed on a separate network entity than the GCS and interconnect to the GCS to thereby support the processing described. Further, the E-OTD timing reference generation method may be used alone or in combination with the WLS-generated timing measurements.

Figure 6:
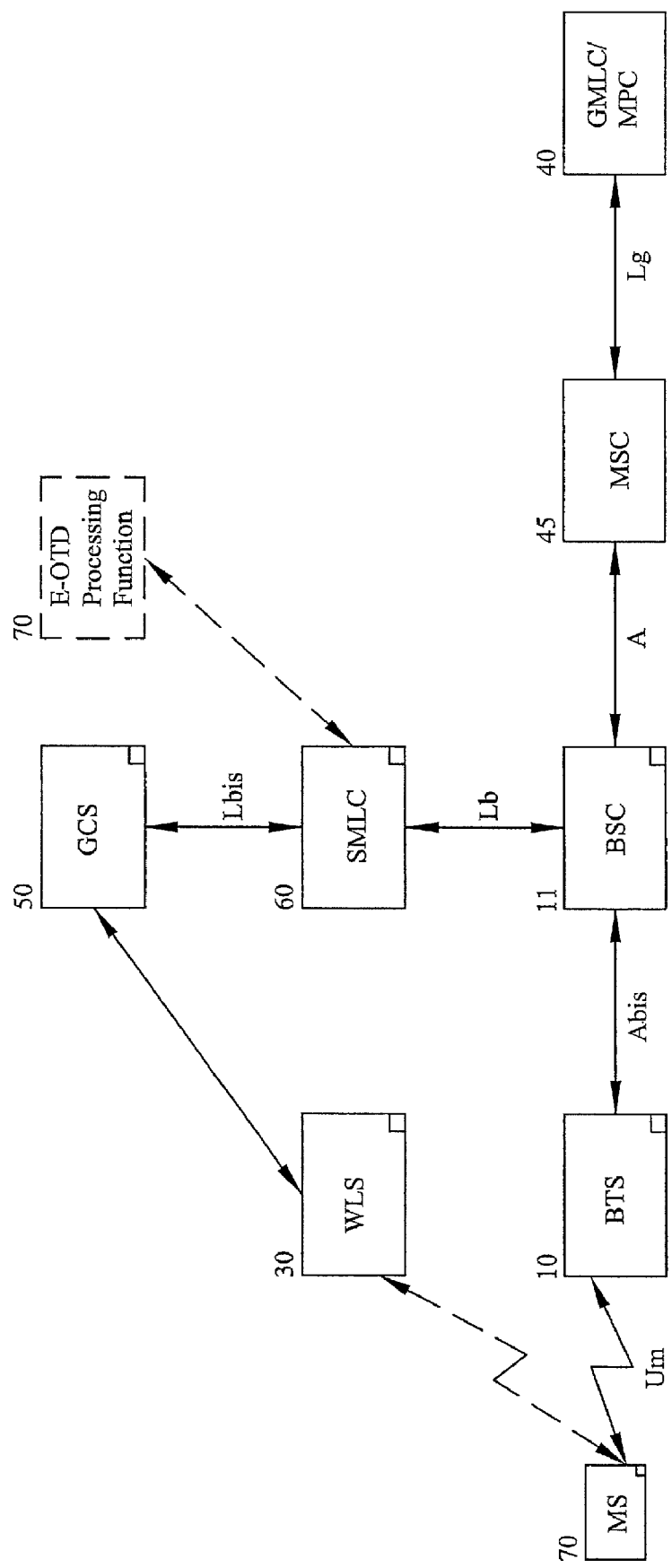
FIG. 6 is another embodiment of an E-OTD augmented U-TDOA system according to the present disclosure.

FIG. 6 shows an alternative architecture of a system implementing the combination of U-TDOA and E-OTD where the AMU 65 has been eliminated, and the measurements previously provided by the AMU are provided to the SMLC 60 by the SMLC's connection to the BSC 11 via the Lb interface.

The GCS 50 provides U-TDOA location estimates to the SMLC 60 for delivery via the GMLC to the end user. Much of this architecture is described in the 3GPP standards for enabling location services. The E-OTD-based location estimate function and timing reference generation may reside in the SMLC, GCS or in a separate network entity E-OTD processing center 70 as shown.

Figure 7:
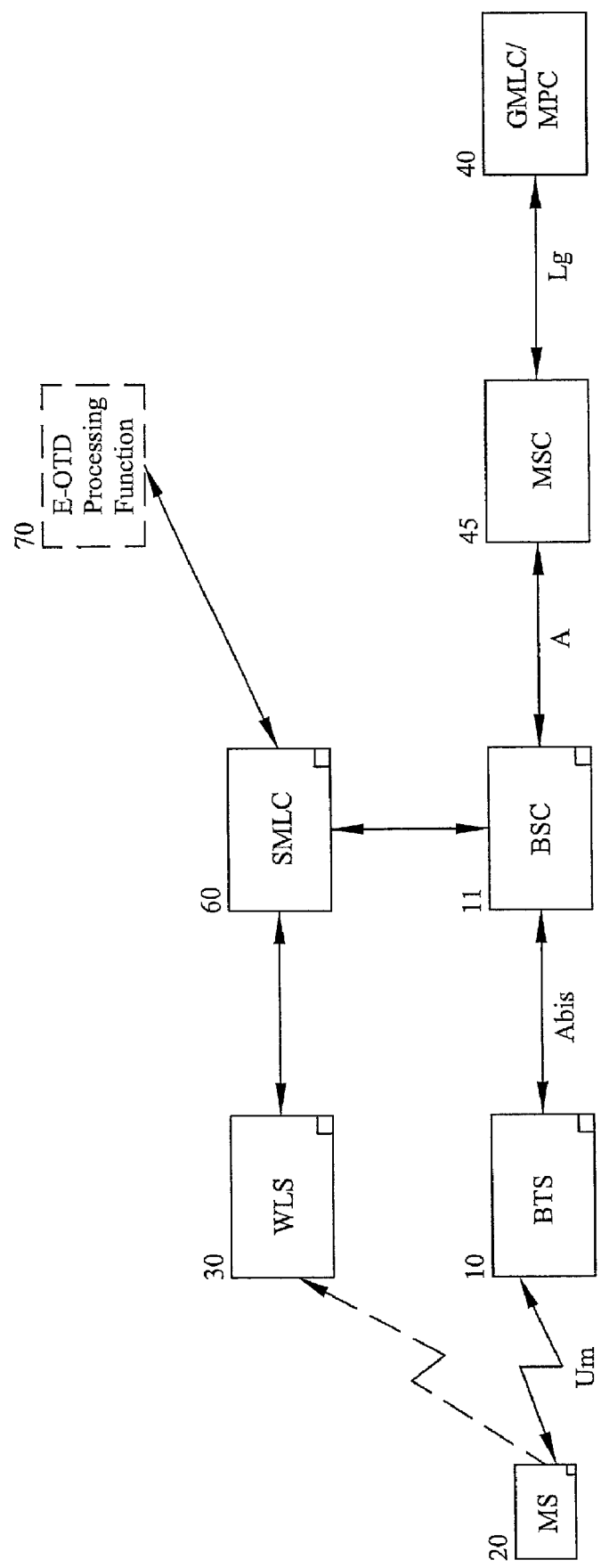
FIG. 7 is still another embodiment of an E-OTD augmented U-TDOA system according to the present disclosure.

FIG. 7 illustrates another architecture for implementing the subject matter where the GCS functionality has been collapsed into the SMLC 60. Again, portions of the E-OTD functionality can be supported in a separate network entity connected to the SMLC 60.

Other combinations of these architectures are also envisioned. For example, an AMU may be used with FIG. 6 to provide the E-OTD measurements to the GCS 50 if the measurement data are not available from other sources.

Figure 8:
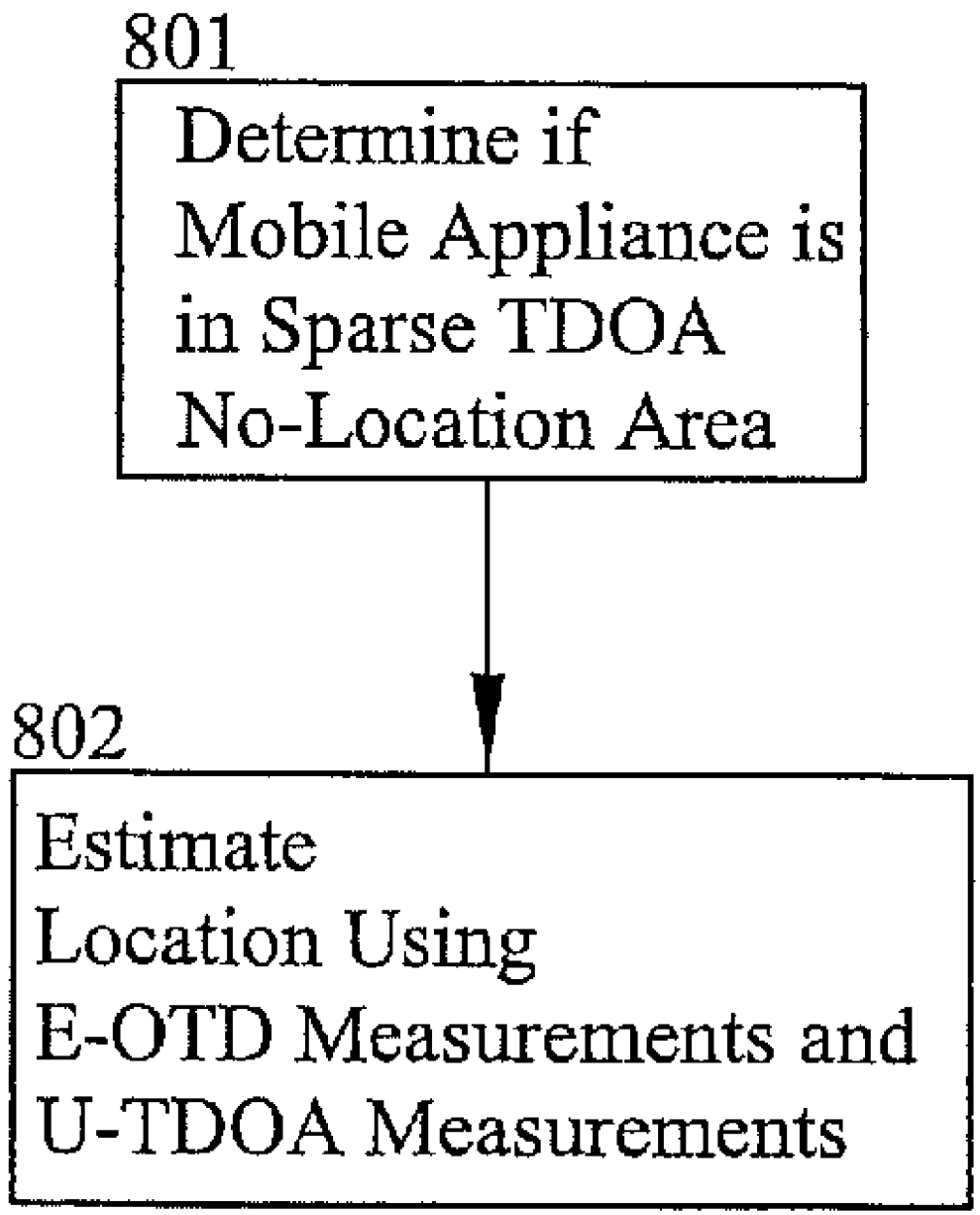
FIG. 8 is a representative flow chart of an embodiment of the present disclosure to locate a mobile appliance in a no geolocation area with E-OTD augmentation.

FIG. 8 is a representative flow chart of a method of determining the location of a mobile appliance where the geographic area served by the wireless communication system has "no location areas." The geo-location system determines if the mobile appliance is in the "no location area" as shown in Block 801. This determination can be made from the lack of a location estimate using TOA or TDOA or can be made from information about the serving cell site such as whether it has or does not have a co-located WLS as determined from a database or other information source. Upon a determination that the mobile appliance is in a "no location area," the system obtains E-OTD measurements on the forward signals to complement (augment) U-TDOA measurements to determine an estimate of the location of the mobile appliance as shown in Block 802. It is envisioned that the E-OTD data may be obtained from an Abis monitoring unit.

The prior descriptions have addressed the combination of U-TDOA and E-OTD measurements derived from uplink (U-TDOA) and downlink (E-OTD) sources respectively. These sources of timing data can be referenced to a common time base (such as GPS) so that they can be used together to estimate location (given that the locations of the base stations and the timing measurement units (WLS) in both cases are known). Embodiments of the subject matter may be extended to other timing measurement sources as long as the assumptions about source location and common time reference (or the ability to place on a common time reference) hold. For example, another common time base may be timing measurements from pilot signals emanating from CDMA phones or networks. Another example or application of the approach as discussed in the present disclosure is where satellite-based signals such as from GPS, Global Orbiting Navigation Satellite System (GLONASS) or Global Navigation Satellite System (GNSS) satellites are combined with U-TDOA or E-OTD (or both) measurement types.

While preferred embodiments of the disclosed system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. A method of locating a mobile appliance in a network overlay geolocation system having a plurality of base stations and a second plurality of wireless location sensors comprising:

measuring the time of arrival (TOA) of a reverse signal from the mobile appliance at one or more of the second plurality of wireless location sensors (WLS) to create time difference of arrival (TDOA) measurements;

synchronizing the TDOA measurements of the reverse signal to a common time base and;

measuring the TOA of a forward channel from one or more of the plurality of base stations at the mobile appliance to create enhanced observed time difference (E-OTD) measurements; and, determining a location estimate based on the TDOA measurements of the reverse signal and the E-OTD measurements.

2. The method of claim 1, comprising: the step of synchronizing the E-OTD measurements of the forward channels to a second common time base.

3. The method of claim 2 comprising: the step of synchronizing the E-OTD measurements by making over determined location measurements of mobiles at a plurality of locations.

4. The method of claim 2 comprising: the step of synchronizing the E-OTD measurements with WLS measurements on the forward channel from one or more of the plurality of base stations.

5. The method of claim 4, wherein the step of synchronizing E-OTD measurements to a common time base comprises the step of monitoring the broadcast control channel (BCCH) of the forward channels from the one or more of the plurality of base stations.

6. The method of claim 1 comprising: the step of determining surfaces associated with TDOA measurements and E-OTD measurements.

7. The method of claim 6, comprising: the step of determining the location estimate based at least in part by the intersection of the surfaces associated with TDOA measurements and E-OTD measurements.

8. The method of claim 1, wherein the common time base is a Global Positioning System (GPS) clock.

9. The method of claim 1, wherein the common time base is selected from the group comprising Global Orbiting Navigation Satellite System, Global Navigation Satellite System and Code Division Multiple Access (CDMA) network.

10. The method of claim 1, wherein the first plurality of base stations is greater than the second plurality wireless location sensors.

11. The method of claim 2, wherein the first time base and the second time base are the same.

12. The method of claim 6, wherein the location surfaces determined from E-OTD measurements are determined separate from the network overlay geolocation system.

13. In a sparse geo-location network overlay system having a plurality of base stations and at least two wireless location sensors (WLS), wherein uplink signals are received by the at least two wireless location sensors and downlink signals are received by a mobile appliance, a method of locating the mobile appliance comprising:

synchronizing the time of arrival of the uplink signal at the at least two wireless location sensors to a common clock;

synchronizing the time of arrival of a downlink signal from one or more of the plurality of base stations at the mobile appliance to a second common clock;

determining a location estimate based on the synchronized time of arrival of the downlink signal and the synchronized time of arrivals of the uplink signals.

14. The method of claim 13, wherein the step of synchronizing the time of arrival of the downlink signal is done by making over determined location measurements of mobiles at a plurality of locations.

15. The method of claim 13 comprising: the step of synchronizing the time of arrival of the downlink signal with WLS measurements on the downlink channel from one or more of the plurality of base stations.

16. The method of claim 13, wherein the step of synchronizing the time of arrival of the uplink signal comprises monitoring the broadcast control channel (BCCH) of the forward channels from the one or more of the plurality of base stations.

17. The method of claim 13, comprising: the step of determining location surfaces associated with time of arrival of the uplink and downlink signals.

18. The method of claim 17, comprising: the step of determining the location estimate based at least in part by the intersection of the surfaces associated with time of arrival of the uplink and downlink signals.

19. The method of claim 13, wherein the common clock is a Global Positioning System clock.

20. The method of claim 13, wherein the common clock is selected from the group comprising Global Orbiting Navigation Satellite System, Global Navigation Satellite System and Code Division Multiple Access (CDMA) network.

21. The method of claim 13, wherein the common clock and the second common clock the same.

22. A method for estimating the location of a mobile appliance operating in a wireless communication system comprising:

measuring a time of arrival (TOA) of an uplink signal from the mobile appliance received at a plurality of wireless location sensors;

determining a location estimate based at least in part on the TOA of the uplink signal;

determining a location accuracy of the location estimate;

comparing the location accuracy to a predetermined threshold;

if the location accuracy is less that the predetermined threshold:

measuring TOAs of downlink signals from a plurality of base stations at the mobile appliance;

determining a second location estimate based at least in part on the TOAs of the downlink signals;

determining a second location accuracy of the second location estimate;

comparing the second location accuracy to the predetermined threshold;

if the second location accuracy is less than the predetermined threshold;

determining a third location estimate based at least in part on the uplink TOA and the downlink TOAs.

23. The method of claim 22, wherein the uplink and downlink TOAs are synchronized to a common time base.

24. The method of claim 23, wherein the common time base is a Global Positioning System (GPS) clock.

25. The method of claim 23, wherein the common time base is selected from the group comprising Global Orbiting Navigation Satellite System, Global Navigation Satellite System and Code Division Multiple Access (CDMA) network.

26. The method of claim 22, wherein at least one location surface is generated from the uplink TOA and at least another location surface is generated from the downlink TOAs.

27. The method of claim 26, wherein the third location estimate is based at least in part on the intersection of the at least one location surface and the at least another location surface.

28. The method of claim 22, wherein the first location estimate and the second location estimate are determined at a Geolocation Control System (GCS).

29. The method of claim 22, wherein the first location estimate is determined at a Geolocation Control System (GCS) and the second location estimate is determined at a processing center separate from the GCS.

30. In a wireless communication system having a sparse deployment of wireless location sensors wherein one or more base stations of the wireless communication system are not associated with a co-located wireless location sensor and wherein a geographic area served by the wireless communication system has a no location area, a method of determining the location of a mobile appliance comprising:

determining if the mobile appliance is in the no location area as a function of time difference of arrival measurements of the reverse link, and;

using enhanced observed time difference (E-OTD) measurements from the forward link and time of arrival (TOA) measurements from the reverse link to estimate the location of the mobile appliance.

31. The method of claim 30, wherein the step of determining if the mobile appliance is in the no location area comprises accessing a database.

* * * * *